US005283436A

United States Patent [19]

Wang

[11] Patent Number: 5,283,436

[45] Date of Patent: Feb. 1, 1994

[54] GENERATION OF AN EXACT THREE-DIMENSIONAL QUADRUPOLE ELECTRIC FIELD AND SUPERPOSITION OF A HOMOGENEOUS ELECTRIC FIELD IN TRAPPING-EXCITING MASS SPECTROMETER (TEMS)

[75] Inventor: Yang Wang, Bremen, Fed. Rep. of Germany

[73] Assignee: Bruker-Franzen Analytik GmbH, Fed. Rep. of Germany

[21] Appl. No.: 867,673

[22] PCT Filed: Jan. 8, 1990

[86] PCT No.: PCT/EP90/00030

§ 371 Date: Jun. 30, 1992

§ 102(e) Date: Jun. 30, 1992

[87] PCT Pub. No.: WO91/11016

PCT Pub. Date: Jul. 25, 1991

[51] Int. Cl.[5] ........................ B01D 59/44; H01J 49/00

[52] U.S. Cl. .................................... 250/292; 250/282

[58] Field of Search ........................ 250/281, 282, 292

[56] References Cited

U.S. PATENT DOCUMENTS

| | | | |
|---|---|---|---|
| 2,769,910 | 11/1956 | Elings | 250/292 |
| 2,939,952 | 6/1960 | Paul | 250/41.9 |
| 3,501,631 | 3/1970 | Arnold | 250/292 |
| 3,527,939 | 9/1970 | Dawson | 250/41.9 |
| 3,648,046 | 3/1972 | Denison | 250/41.9 |
| 4,704,532 | 11/1987 | Hua | 250/292 |
| 4,755,670 | 7/1988 | Syka et al. | 250/292 |
| 4,945,234 | 7/1990 | Goodman | 250/292 |
| 4,985,626 | 1/1991 | Margulies | 250/292 |
| 5,055,678 | 10/1991 | Taylor et al. | 250/292 |
| 5,105,081 | 4/1952 | Kelley | 250/292 |

FOREIGN PATENT DOCUMENTS

| | | | |
|---|---|---|---|
| 2522151 | 2/1983 | France | G01N 27/62 |

*Primary Examiner*—Bruce C. Anderson
*Attorney, Agent, or Firm*—Walter A. Hackler

[57] ABSTRACT

An exact three-dimensional rotationally symmetric quadrupole field or an electric field of higher multipole moments can be generated by closed boundaries with continuously varied potential, especially with linearly variable potential, in the ideal case by simple cone-shaped boundaries with linearly variable potential. An example for the application of the field is storage of charged particles inside the closed boundaries. Within the same cone-shaped boundaries, a homogeneous ideal field in the direction of the symmetry axis can be superimposed. This field can be employed for excitation of the kinetic energy, for quenching, or for energy analysis of the stored charged particles. For the generation of mass spectra the mass-to-charge specific fundamental frequencies of the charged particles stored in the electrode structure are excited. The image currents induced in the electrode structure are frequency analysed (e.g. by Fourier transform).

28 Claims, 13 Drawing Sheets

GENERATION OF AN EXACT THREE-DIMENSIONAL QUADRUPOLE ELECTRIC FIELD AND SUPERPOSITION OF A HOMOGENEOUS ELECTRIC FIELD IN TRAPPING-EXCITING MASS SPECTROMETER (TEMS)

BACKGROUND OF THE INVENTION

This invention relates to a method of generating a three-dimensional rotationally symmetric quadrupole electric field or an electric field of higher multipole moments inside an electrode structure forming the boundary of the field by application of a resultant electric potential $\Phi_{\varphi 0}$ to the electrode structure.

Up to now, three-dimensional rotationally symmetric quadrupole fields were generated by an array of metallic electrodes with hyperbolic isopotential surfaces (U.S. Pat. No. 2,939,952 and U.S. Pat. No. 3,527,939). As an example in FIG. 1 the standard structure is shown, which consists of a ring electrode (1) of radius r and two end caps (2) of distance $2z_0 \cdot r_0$ and $z_0$ are characteristic dimensions, which are related to the spacings of the hyperbolic surfaces from the center of the structure. The application of the three-dimensional rotationally symmetric quadrupole field to trap ions and charged particles and to study the properties of the trapped species and to generate mass spectra is well reported in the literature (Quadrupole Mass Spectrometry and Its Applications, P. H. Dawson, Ed., Elsevier, Amsterdam, 1976, and D. Price and J. F. J. Todd, Int. Mass Spectrom. Ion Processes, 60 (1984) 3).

For the generation of mass spectra chiefly four methods are described:

- Mass analyzer method, disclosed in U.S. Pat. No. 2,939,952,
- The mass-selective storage method disclosed in U.S. Pat. No. 3,527,939,
- The mass-selective instability method disclosed in U.S. Pat. No. 4,540,884,
- Detection of image currents disclosed in U.S. Pat. No. 2,939,952, published in E. Fischer, Z. Phys., 156 (1969) 26, employing Fourier Transformation.

The generation of a three-dimensional electric quadrupole field by hyperbolically shaped metallic electrodes generates several severe problems:

- The manufacturing of electrodes is complicated and costly.
- Due to the finite size of the electrodes, field imperfections are generated.
- Since gaps exist between ring and cup electrodes the resulting quadrupole field is easily influenced by charges accumulated on the surface of the electrodes.
- The detection of the image current signal generated by the ions is disturbed by other electric fields.
- The image current generated by the charged particles depends on their position in the trap, resulting in a noise signal.

Finally, there is one further important disadvantage in generating a three-dimensional electric quadrupole field using hyperbolically curved electrodes: It is impossible to generate additional electric fields within the same interior region of the electrodes without any interference with the first electric field.

However, employing metallic electrodes with hyperbolic surfaces is not the only possibility of generating three-dimensional quadrupole fields, although up to now only electrode surfaces following the equipotential surfaces at the boundary of the electric field are commonly used because of prejudice.

Accordingly, it is an object of the invention to provide a method and the corresponding structures for generating a three-dimensional quadrupole electric field or an electric field of higher multiple moments which is much more exact, using no hyperbolically curved metallic electrodes and thus presenting the possibility of superimposing additional homogeneous electric fields without interference with the first electric field.

SUMMARY OF THE INVENTION

This object is achieved according to the invention by continuously varying the resultant electric potential $\Phi_{\varphi 0}$ across the electrode structure.

Since the electric potential applied to the electrode structure is not constant, but varies continuously across the electrode structure, those surfaces of the electrode structure forming the boundary of the electric field must not be parallel to the equipotential surfaces of the electric field at its boundary. In other words, those parts of the electrode structure forming the boundary of the electric field do not necessarily have to be curved, but are only required to form contours corresponding to the boundary conditions of an implied resultant electric potential generating the quadrupole electric field or an electric field of higher multipole moments.

In one embodiment of the invention the resultant electric potential is continuously varied with position on the surface of the electrode structure adjacent to the electric field. In another embodiment the resultant electric potential is composed of a plurality of single electric potentials being applied each to separate electrodes forming the electrode structure. In both cases, an electric potential which continuously varies across the electrode structure and which generates a quadrupole field results.

As a special case of a continuously varied resultant electric potential there can be chosen a linearly varied resultant potential. Even for this special choice there exists an infinite plurality of possible boundary conditions for the resultant electric potential generating the three-dimensional rotationally symmetric quadrupole electric field or an electric field of higher multipole moments. Among these boundary conditions there is again a special solution, namely the case of a double-cone shaped boundary in which an applied linearly varied electric potential generates a quadrupole field. Such a double-cone shaped structure can be manufactured very easily and with high precision.

By the choice of an appropriate second potential applied to the electrode structure, a second electric field inside the electrode structure which is homogeneous in the symmetry axis direction can be generated and superimposed upon the quadrupole field without interaction. The possibility of creating such a homogeneous electric field not interfering with the quadrupole electric field is one of the major advantages of the method according to the invention.

The main application of this method will be the field of mass-spectrometry, especially the mass selected analysis of stored ions. In one variant of the method according to the invention the ions to be analyzed are generated outside the electrode structure. They could be e.g. components of an ion beam directed into the electrode structure. Another possibility is the creation of ions out of neutral particles inside the boundary of the quadrupole field. In this case the ionization may be performed by electron impact, ion-impact or resonant photon absorption. Accordingly, for the generation of the ions, an electron beam, a primary ion beam or a laser beam can be employed. It can be of advantage, if the ionizing beams are pulsed. In this case it is possible to perform the mass-spectrometric analysis of the stored ions in a time-dependent mode by running a plurality of measuring cycles. In certain applications, it might be, on the other hand, desirable to use a c.w. ionizing beam, for example, if a scattering experiment with a primary ion beam shall be performed or, if charge exchange processes are to be studied.

In a variant of the method according to the invention, the above mentioned second, homogeneous electric field inside the boundary of the quadrupole electric field or the electric field of higher multipole moments is used for a mass-to-charge specific excitation of the fundamental frequencies of the ions to be analyzed. This will cause a resonant movement of the excited charged particles in the direction of the symmetry axis. As a result of this resonant movement image current signals are induced in the electrode structure which can be differentially detected and processed with a frequency-analyzer. Employing Fourier Transformation techniques for the frequency analysis can be especially advantageous.

In another variant of the method according to the invention the excitation of the ions under investigation by the second homogeneous field is used for ejecting the ions out of the boundaries of the first electric field and detecting them with a charge-sensitive detector. This can be, for example, desirable, if the number of ions under investigation inside the electrode structure is so small, that the image current induced by the ion movements has an amplitude below the noise signal level. In this case the detection of single ions by an appropriate detector, like e.g. a secondary electron multiplier, a channeltron or a multichannel plate, might be the only alternative to the image current method.

In an embodiment of the invention an electrode structure is operated according to the methods described above. This electrode structure defines on the one hand the boundary of the electric quadrupole field or the electric field of higher multipole moment and, on the other hand, the behaviour of the electric potential being applied to the electrode structure and generating the electric field.

In one embodiment, those parts of the electrode structure facing the electric field and defining the boundary of the field consist of electrically resistive material. This can be accomplished either by coating a non-conductive substrate material with resistive material at those parts adjacent to the electric field, or one can use resistive wires for the construction of the electrode structure.

In both cases the operation of the electrode structure is similar to that of a continuous potentiometer and the construction consists substantially of a single part.

In embodiments of the invention the resistive wire can be helically wound or constructed to form a double umbrella framework.

In a further embodiment of the invention the electrode structure is built of metallic material. In this case the electrode structure is constructed of a plurality of metallic sheets to which a plurality of single electric potentials is applied constituting a resultant electric potential which in turn generates the quadrupole electric field or an electric field of higher multipole moments. The spatial boundary of the rotationally symmetric quadrupole field can be defined by circular holes with successively varying radii whereby the metallic sheets are disposed with parallel equal or unequal distances.

In an embodiment the metallic sheets are linked together by a resistor network. In this case it is not necessary to generate an appropriate potential for each sheet but the negative and the positive output of a single voltage source is applied to the ends of the electrode structure and the resistances of the network are chosen such that the potentials and the single sheets form a resulting continuously varying potential.

In an embodiment the metallic sheets are equally spaced and the resistors have the same resistance. This facilitates the manufacturing of the electrode structure.

In a further embodiment the metallic sheets with equal areas are equally spaced. Applying RF-voltage to this electrode structure one can even omit the resistance network.

For the passing of the particles under investigation and, if necessary, the ionization means, like e.g. an electron beam, the electrode structures according to the invention comprise apertures. Especially when beams are employed, it is of advantage to dispose the apertures at opposite points of the boundary surface with respect to the symmetry center of the electrode structure. In the case of an "airy" construction, like the helically wound resistance wire or the metallic sheets, the apertures are already built in, construction due to the principle of.

In an embodiment of the invention with a double-cone shaped electrode structure two ring plane electrodes at a distance $\pm 1\, z_0$ from the plane defined by the annular contact line of the two cones are provided for detecting the image currents of ions moving in the symmetry axis direction inside the field boundary.

The invention will now be described and explained in greater detail by way of the embodiments shown in the drawing, it being understood that the features described in the specification and shown in the drawing may be used in other embodiments of the invention either individually or in any desired combination.

DETAILED DESCRIPTION

Figure 1:
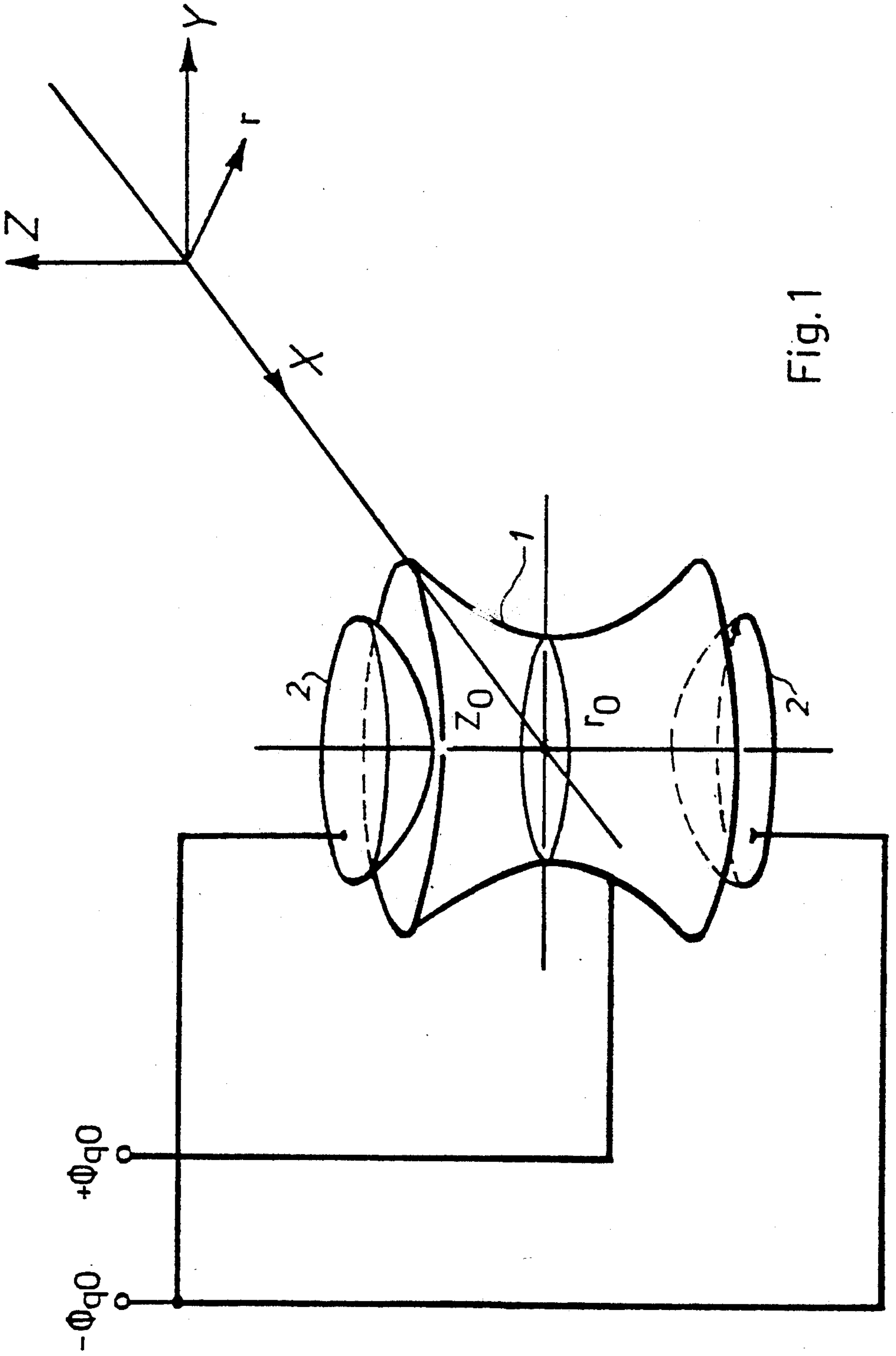
FIG. 1 shows a metallic structure with hyperbolic isopotential surfaces for generation of a three-dimensional rotationally symmetric electric quadrupole field by application of the potentials $\pm\Phi_{q0}$ to the ring (1) and end cap electrodes (2)

The invention provides a method and the corresponding apparatus for generating an exact three-dimensional quadrupole field or an electric field of higher multipole moments and a method and corresponding apparatus for superimposing additional homogeneous electric fields in the symmetry-axis direction on the first field. The application of the device to store charged particles and to generate mass spectra by simultaneous or consecutive detection of the image currents induced by the charged particles in the electrode structure or by charge detection is also presented.

PRINCIPLES OF MASS ANALYSIS OF CHARGED PARTICLES TRAPPED IN ELECTRIC QUADRUPOLE FIELDS

If positive and negative voltages $$\pm\Phi_{q0} = \pm(U - V\cos\Phi t) \quad (1)$$

are imposed separately on a ring plane electrode and two end-plane electrodes of a cone shaped structure, described in detail later on, three-dimensional rotationally symmetric quadrupole fields are generated within the interior region of the electrode structure. This field will be called the trapping field. With ionizing radiation or an electron beam of sufficient energy passing into the trap structure, neutral molecules inside the trap are ionized and a number of ions of different mass-to-charge ratio m/q are generated with certain initial conditions of motion.

The trajectories of the charged particles in the fields can be expressed by the canonical form of the linear Mathieu equation $$\frac{d^2r}{d^2\xi} + (a_r - 2_{qr}\cos 2\,\xi)r = 0 \quad (2)$$

$$\frac{d^2r}{d^2\xi} - (a_z - 2_{qz}\cos 2\,\xi)z = 0$$

with parameters $$a_r = \frac{8\,q\,U}{mr_o^2\,\omega^2} \qquad a_z = \frac{16\,q\,U}{mr_o^2\,\omega^2} \quad (3)$$

$$q_r = \frac{4\,q\,V}{mr_o\,\omega^2} \qquad q_z = \frac{8\,q\,V}{mr_o^2\,\omega^2} \qquad \xi = \frac{\omega t}{z}$$

The solution to the Mathieu equation leads to stable or unstable trajectories of the charged particles, depending only on the selection of the parameters (3). For a given set of parameters, U, V, $r_0$, the charged particles of a certain m/q range have stable trajectories, the other charged particles have unstable trajectories. The charged particles of the same mass-to-charge ratio have the same motion regularities which can be considered as the sum of an infinite series of sinusoidal oscillations with frequencies $$\omega_0 = \frac{\beta_{r,z}}{2}\,\omega \quad (4)$$

$$\omega_1 = \left(1 - \frac{\beta_{r,z}}{2}\right)\omega$$

$$\omega_2 = \left(1 + \frac{\beta_{r,z}}{2}\right)\omega$$

The characteristic parameters $\beta_{r,z}$ satisfy $0 \leqq \beta 1$ and have a known relationship to parameters $a_{r,z}$ and $q_{r,z}$. Therefore a relationship between the $\beta$ values and the m/q ratios can be obtained $$\beta_{r,z}\,(a_{r,z}, q'_{,z}) = \beta_{r,z}\left(\frac{m}{q}\right) \quad (5)$$

The component frequencies of ion motion are unique and specific for particular m/q ratios. According to the selected range of stable ions, in practical operation, $a_r$ and $a_z$ can be set in zero.

If some form of voltages $\pm\Phi_{z0}$ (t) is additionally imposed on the two end plates of the cone-shaped electrode structure, a second electric field is superimposed in the axial (z) direction on the first field. This second field will be called the excitation field. It acts on the stored charged particles as expressed by the even linear Mathieu equation $$\frac{d^2r}{d\xi^2} + (a_r - 2q_r\cos 2\,\xi)r = 0 \quad (6)$$

$$\frac{d^2z}{d\xi^2} - (a_z - 2q_z\cos 2\,\xi)z = F(\xi)$$

The force F (ξ) depends only on time and not on the position of the charged particles.

According to the theory of differential equations the solution of eq. (16) consists of one independent part with initial conditions and of a second part given in eq. (2). When the excitation frequency matches the characteristic frequency of a charged particle with certain m/q or a subharmonic thereof, resonance occurs and the trapped particle moves with a frequency equal to the characteristic frequency. The amplitude of motion will grow linearly with time. The motion of the trapped particles is now coherent in the z direction. If the characteristic frequencies of the charged particles differ from the excitation frequency no resonance occurs.

In summary, the quadrupole fields have two functions: to trap charged particles with a certain range of m/q ratios and to cause oscillations with frequencies characteristic of the different m/q ratios of the charged particles. With the aid of excitation fields the characteristic frequencies of the trapped charged particles can be excited, so that the motion is coherent in the z direction.

Usually the above mentioned frequencies are in the RF-range.

GENERATION OF POTENTIAL DISTRIBUTION -A SHORT DESCRIPTION OF THE THEORETICAL FOUNDATION

In the absence of space charge, electrostatic potentials $\Phi$ obey the Laplace equation $$\Delta^2 \Phi = 0 \tag{7}$$

with boundary conditions $$\Phi|_s \tag{8}$$

With given boundary conditions (e.g. the contours of a curved surface and the corresponding potential values on the surface) unique electrostatic fields can be defined within the interior region of the boundaries. However, once a specific electrostatic field has been defined according to eq. (7) a wide variety of corresponding boundary conditions according to (8) are still possible. If the potential values on each point of a curved surface correspond to the values of the specific electrostatic field at this point, the Laplace equation (7) and the boundary conditions (8) are also satisfied. If we apply this idea to three-dimensional quadrupole fields, we can select the ideal boundary conditions and the ideal electrode configurations for practical applications.

In cylinder coordinates r and z the potential constituting an exact three-dimensional rotationally symmetric quadrupole field is expressed as $$\Phi_q = \Phi_{qo} \frac{r^2 - 2z^2}{r_o^2} \tag{9}$$

It can be shown that the field resulting from the potential (9) can be generated within interior regions closed by a curved surface which is formed by revolution of a plane curve by potentials varied along this plane curve. The equation of the plane curve in polar coordinates $\rho$, $\Theta$, in the symmetry-axis coordinate cross section, is $$\frac{d\rho}{d\Theta} = \frac{\rho\left[\frac{3}{2}\sin 2\Theta\left(\frac{4\rho^2}{b^2}\{1 + 3\sin^2\Theta\} - 1\right)^{\frac{1}{2}} \mp (1 - 3\sin^2\Theta)\right]}{\frac{3}{2}\sin 2\Theta \mp (3\sin^2\Theta - 1)\left(\frac{4\rho^2}{b^2}\{1 + 3\sin^2\Theta\} - 1\right)^{\frac{1}{2}}} \tag{10}$$

where $$b = \frac{d\Phi s}{ds} \tag{11}$$

For example, with b=0 and $\Phi_s$=constant, one obtains from eq. (10) that electrodes with hyperbolic isopotential surfaces, expressed as $$r^2 - 2z^2 = \text{constant} \tag{12}$$

yield the correct potential (cf. FIG. 1).

The second, most important selection is b=constant, $$b = \frac{d\Phi_s}{ds} = \text{constant} \qquad \Phi_s = bs \tag{13}$$

The potential values vary linearly along the plane curves.

Figure 2:
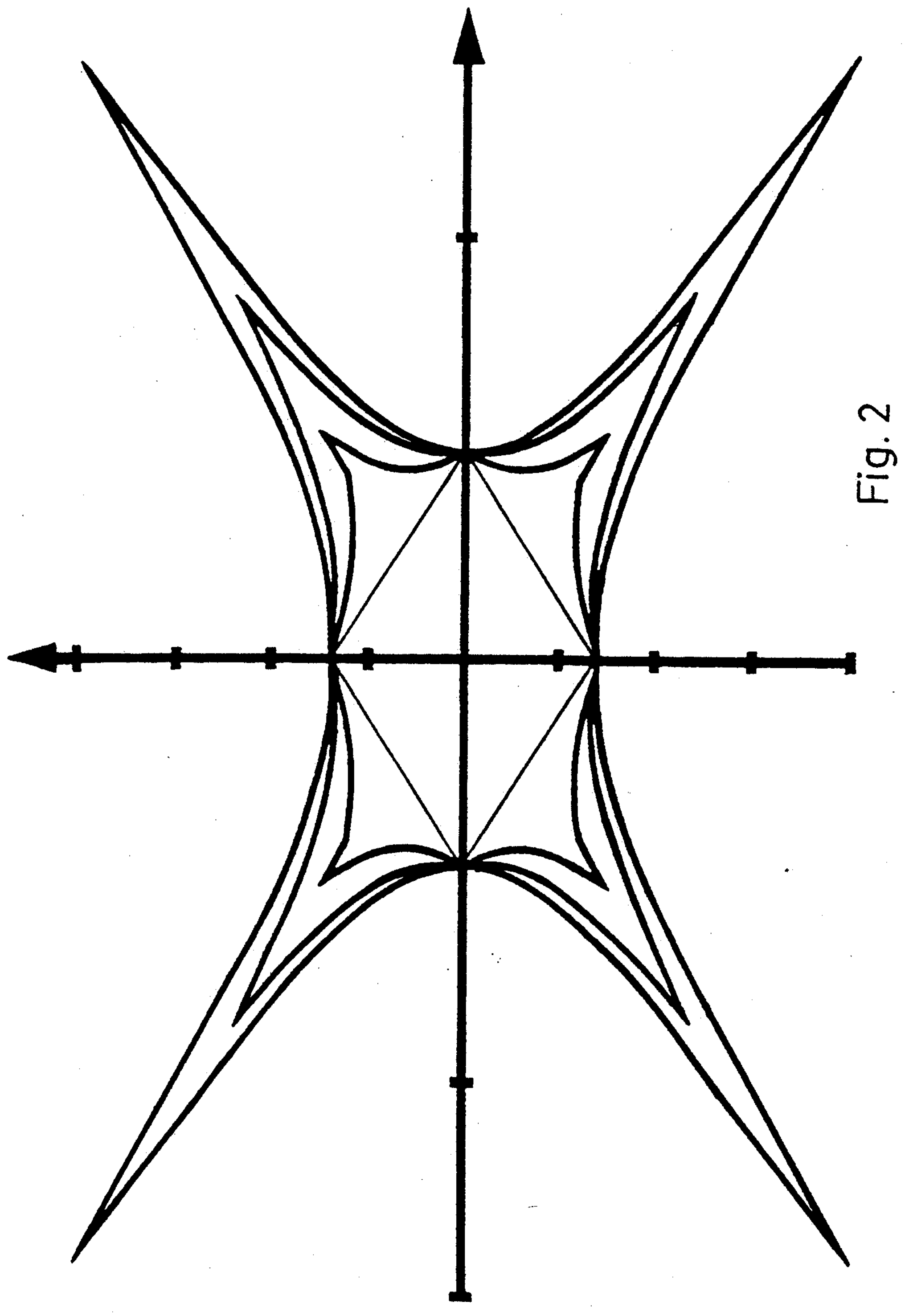
FIG. 2 shows plane curves in the symmetry axis coordinate cross section as a function of r and z with the applied potential varying linearly along these curves.

In FIG. 2 some of the corresponding plane curves in the symmetry-axis coordinates cross section are shown with the conditions $$\left[\frac{\phi_0}{r_0}\right] < b \leqq \frac{2\sqrt{2}}{\sqrt{3}}\left[\frac{\phi_0}{r_0}\right] \tag{14}$$

The outermost curve is for b=0.3 V/cm, the next for b=0.8 V/cm, the third is for b=1.2 V/cm and the innermost curve is for b=1.633 V/cm.

Figure 3:
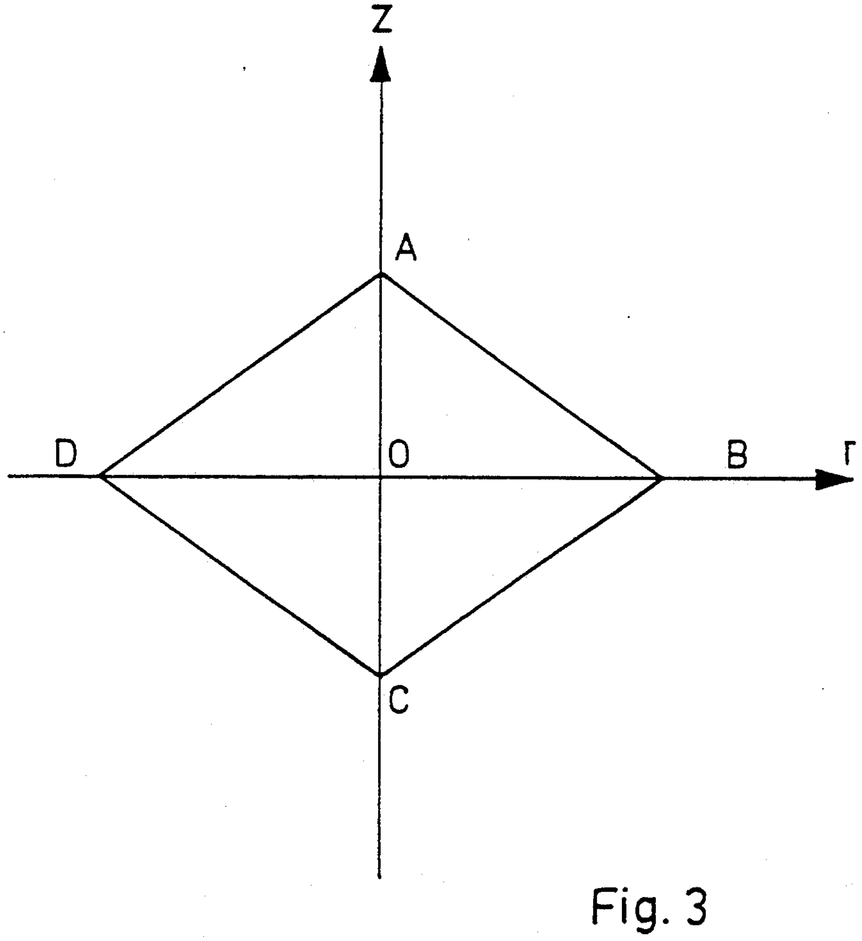
FIG. 3 shows rhombic plane curves with linearly varied potential.

As a special case there exist simple rhombic closed-plane curves on which the potential varies linearly. This is shown in FIG. 3.

Let the expression for one rhombic line AB be $$z = -\frac{z_0 \cdot r}{r_0} + z_0 \qquad 0 \leqq r \leqq r_0 \tag{15}$$

With the aid of eq. (9) one obtains $$\Phi_{q,s} = \Phi_{qo}\left(\frac{2r}{r_0} - 1\right) \tag{16}$$

Obviously, the potential values on line AB vary with r. Therefore exact three-dimensional quadrupole fields can be generated within an interior region with boundaries revolved about the symmetry axis formed by plane rhombic curves:

$$r^2 - 2(z - z_o)^2 = 0 \qquad z \geqq 0$$
$$r^2 - 2(z + z_o)^2 = 0 \qquad z < 0 \tag{17}$$

Figure 4A:
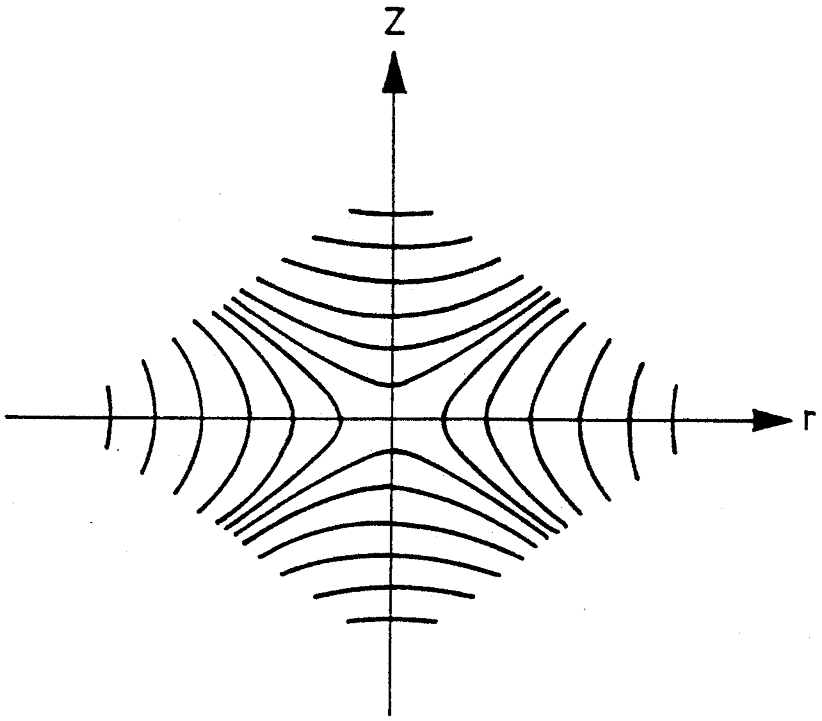
FIG. 4 shows equipotential lines for the potential generated according to FIG. 3 in the rz plane (FIG. 4*a*) and in the xy plane (FIG. 4*b*)
Figure 4B:
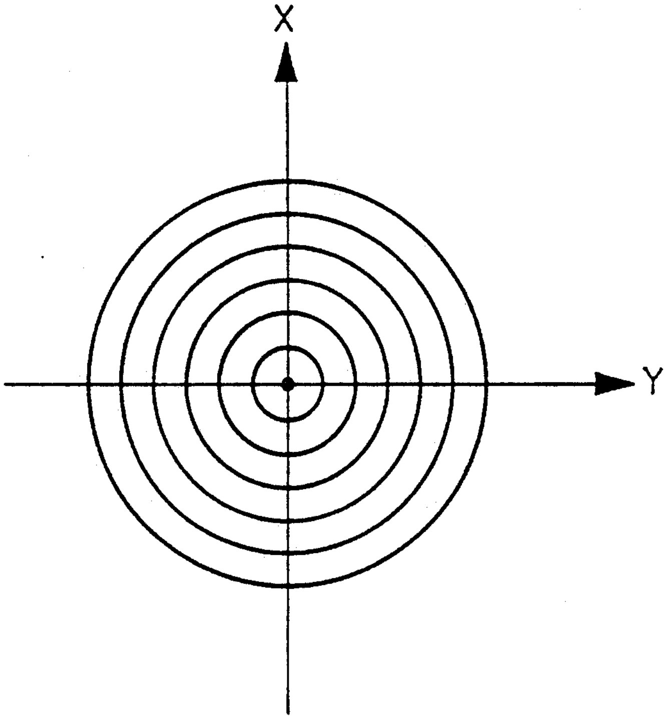

The corresponding contours of the equipotential lines are shown in FIG. 4*a* for the zr plane and in FIG. 4*b* for the xy plane.

In addition a homogeneous field can be generated in the same interior region by applying a second potential which varies linearly along the rhombic boundaries in a way different from the first, for example along the line AB, given in FIG. 3

$$\Phi_{zs} = -\frac{\Phi_{z1} - \Phi_{z2}}{2\sqrt{2}\, z_o} r + \Phi_{z1} \tag{18}$$

Figure 5:
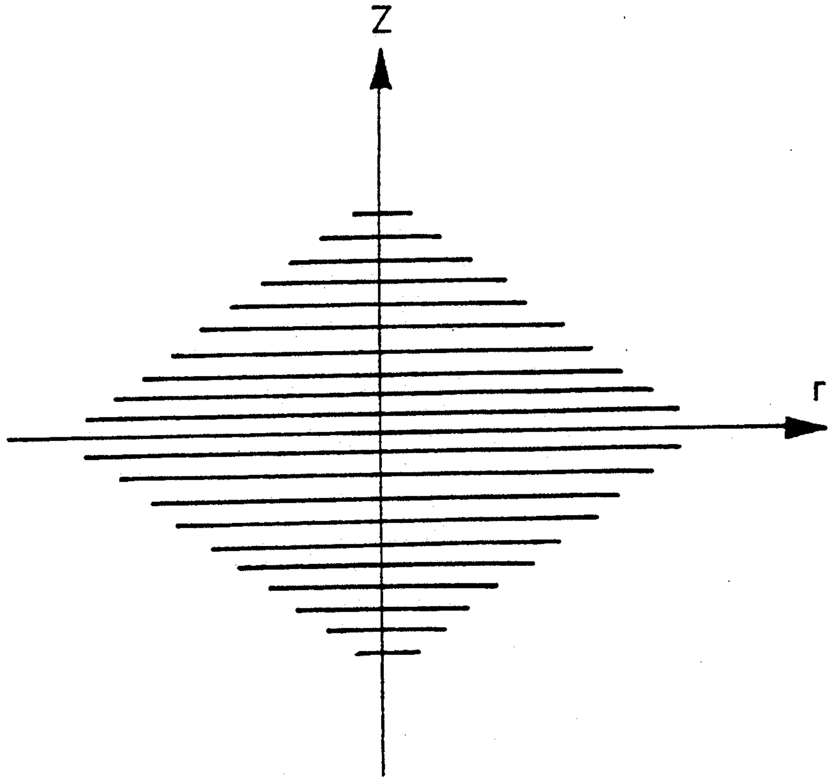
FIG. 5 shows equipotential lines of a homogeneous electric field superimposed upon the quadrupolar or higher multipole electric field in the structure shown in FIG. 3.

This generates the homogeneous field with equipotential lines as shown in FIG. 5.

$$\Phi_z = \frac{\Phi_{z1} - \Phi_{z2}}{2z_o} z + \frac{\Phi_{z1} + \Phi_{z2}}{2} \tag{19}$$

Figure 6:
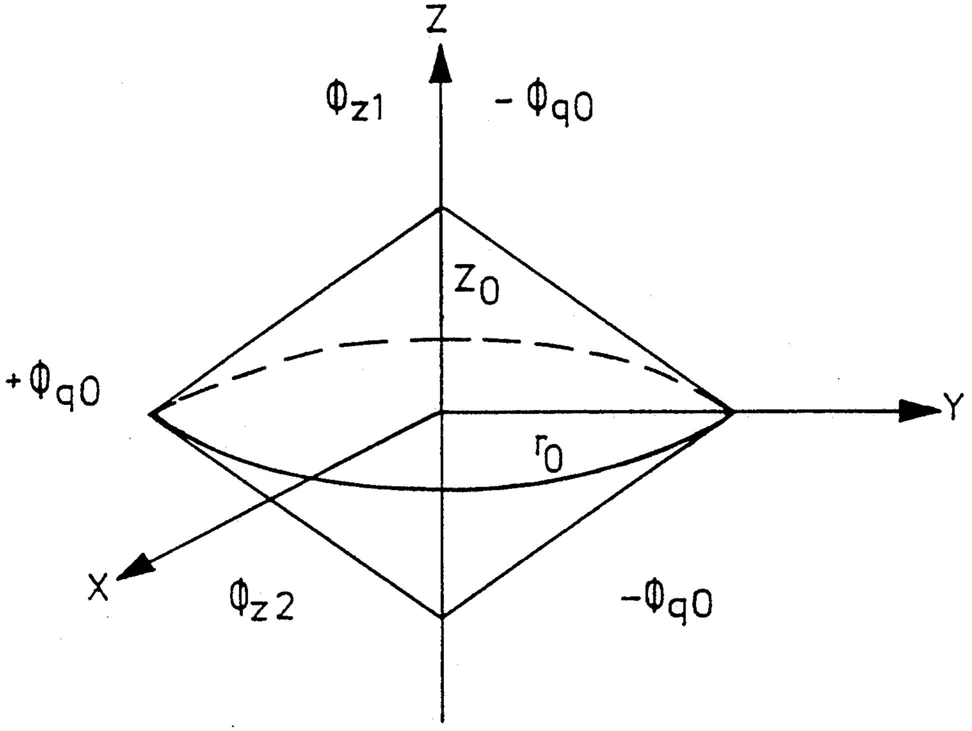
FIG. 6 shows a cone shaped surface region in which exact three-dimensional quadrupole fields and additional homogeneous electric fields are generated.

It can be shown that two or more definite electrostatic fields can be obtained within the same interior regions. Each of these fields can be generated by imposing the corresponding continuously varying potential values upon the boundary surface. In this way exact three-dimensional quadrupole fields and additional exact excitation fields in the symmetry-axis direction can be superposed without interference within the same interior region closed by the cone-shaped surface, shown in FIG. 6. The potential constituting the resultant field is given in eq. (20)

$$\Phi(r,z) = \Phi_q + \Phi_z = \frac{\Phi_{q0}}{r_0^2}(r^2 - 2z^2) + \frac{\Phi_{z1} - \Phi_{z2}}{2z_0} z + \frac{\Phi_{z1} + \Phi_2}{2} \quad (20)$$

where $+\Phi_{q0}$ and $-\Phi_{q0}$ are the applied potentials for generating a quadrupole field, and $\Phi_{z1}$ and $\Phi_{z2}$ are the applied potentials for generating an additional electric field.

EMBODIMENTS

The realization of the exact three-dimensional quadrupole field or an electric field of higher multipole moments according to the new method depends on the method of generation of continuously varied potentials on the corresponding boundaries. Such a continuously varied potential can be realized by a potentiometer-type structure employing electrodes made of electrically resistive material, with the voltage needed for generation of the required surface potential applied to the two ends of the electrode structure situated on the z-axis. Typical values of resistance between the two ends of the electrode range from 1 to 100 kΩ.

In an embodiment of the invention the electrode structure consists of a nonconductive substrate material, e.g. with an electrically resistive coating.

In a preferred embodiment the electrode structure consists of a polymeric halogenized polyolefin, preferably of a polytetraflouorine-ethylene (PTFE), such as Teflon, having a high fraction of carbon ranging preferentially between 10 and 30% by weight.

In a special embodiment the resistive material in the electrode structure comprises semiconductor material like Si, Ge or GaAs.

In another embodiment of the invention, a plurality of metallic sheets is employed as an electrode structure, the sheets having circular holes with successively varying radii to form the inner surface of the rotationally symmetric field boundary and being densely spaced parallel to each other and at equal or unequal distances. These sheets are linked together by a resistor network dimensioned such that applying a voltage according to eq. (1) to the ends of the network results in a potential according to eq. (9). In the case corresponding to equal sheet distances, all resistors have equal resistance and the network can even be omitted if the areas of each metallic sheet are equal and radio frequency is supplied (cf. FIG. 7).

Figure 8:
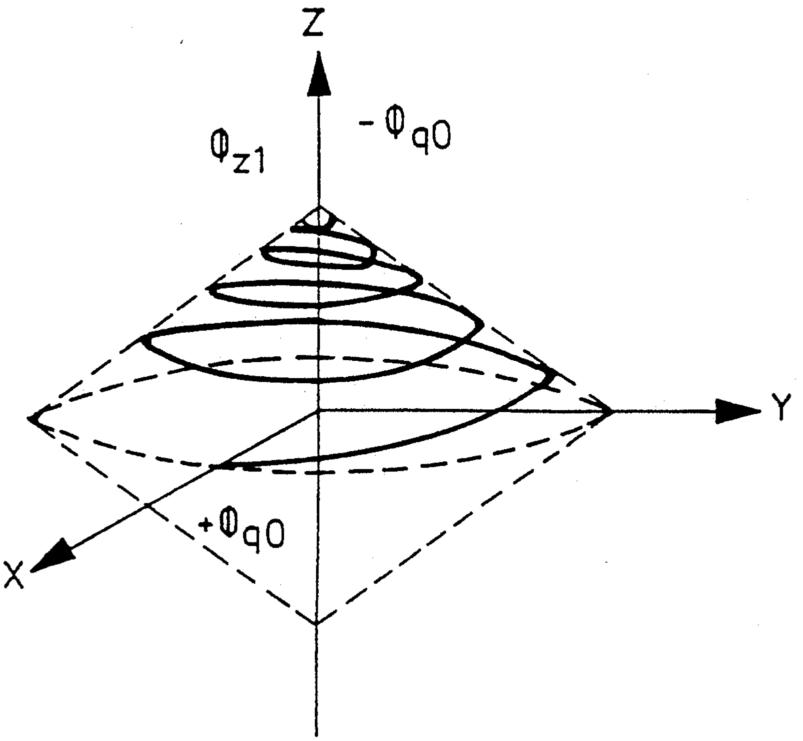
FIG. 8 shows an embodiment of the electrode structure comprising a helically wound resistance wire.
Figure 9:
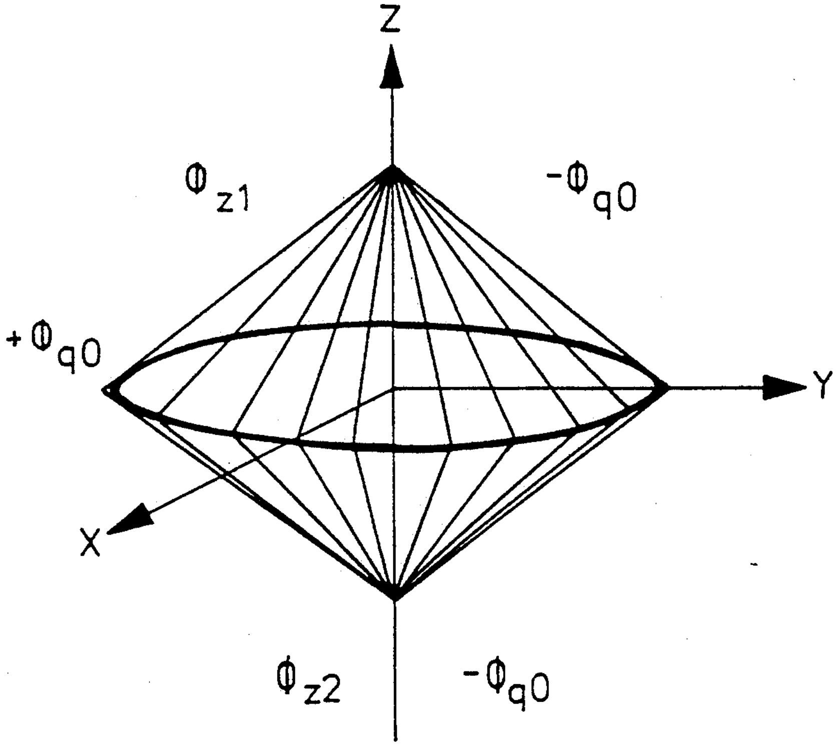
FIG. 9 shows an embodiment of the electrode structure comprising an umbrella framework of resistance wires.

Also other structures for generating the fields can be employed, particularly in the case of cone-shaped boundaries. Among these area a structure with a helically-wound resistance wire, as shown in FIG. 8, or a double-umbrella framework of resistive wires, shown in FIG. 9.

The electrode structures according to the invention comprise apertures disposed at opposite points on the boundary surface with respect to the symmetry center of the cell. The particles to be studied inside the electric field and/or means for ionizing these particles can pass through those apertures. An embodiment of the electrode structure comprises sample beam inlets in the symmetry axis of the electrode structure coaxial with the ionizing electron beam or laser beam discussed later.

Figure 10:
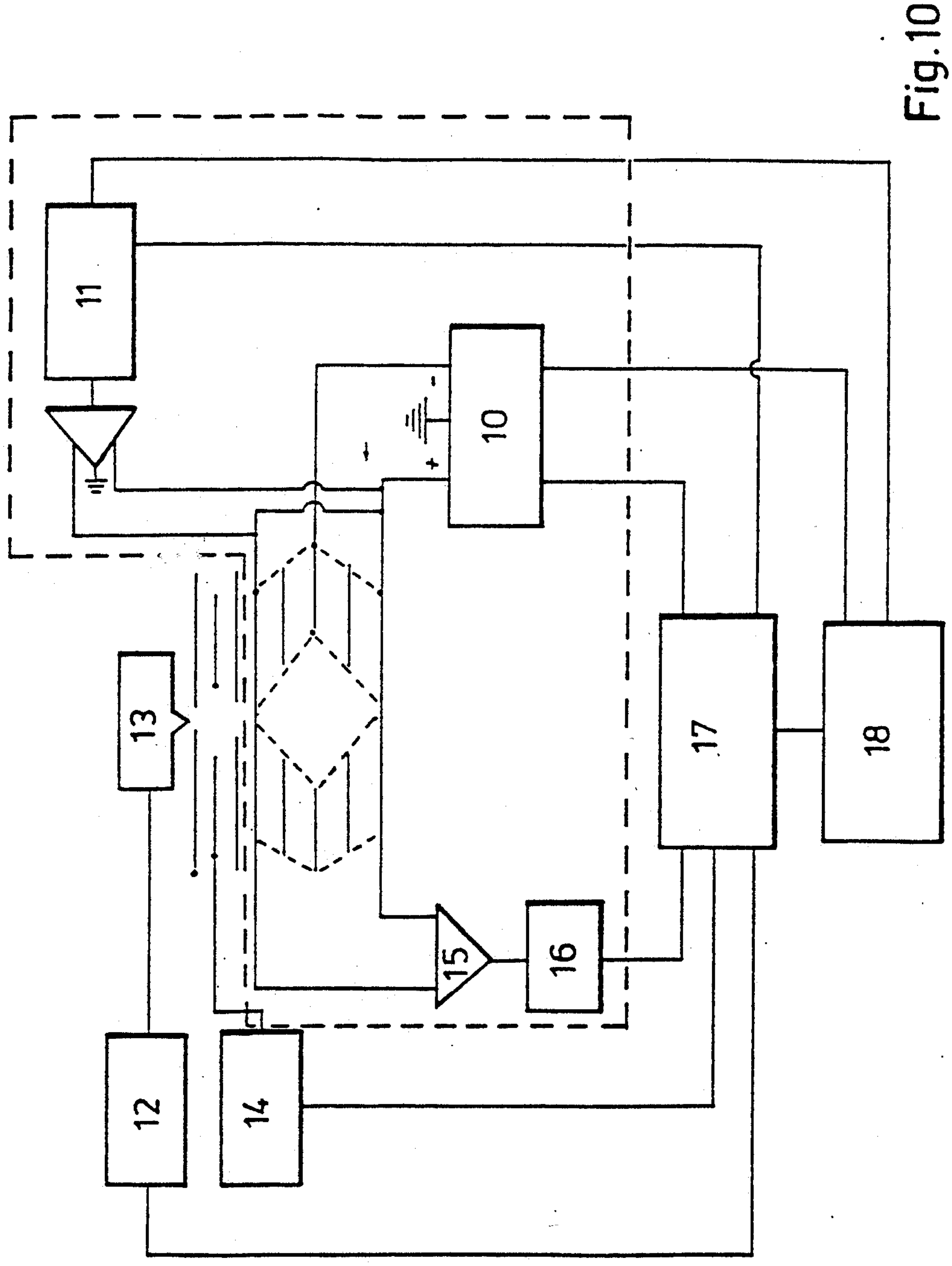
FIG. 10 shows a block diagram of an advantageous realization of the invention.

Now, as an example, the practical realization of a mass spectrometer incorporating the electrode structure which consists of metallic sheets of equal surface areas arranged at equal distances, and connected by a network of equal resistors, will be discussed in detail, as applied to the simultaneous image current detection and frequency analysis of mass-selectively stored charged particles - positive or negative ions in this example. A block diagram is shown in FIG. 10.

Figure 7:
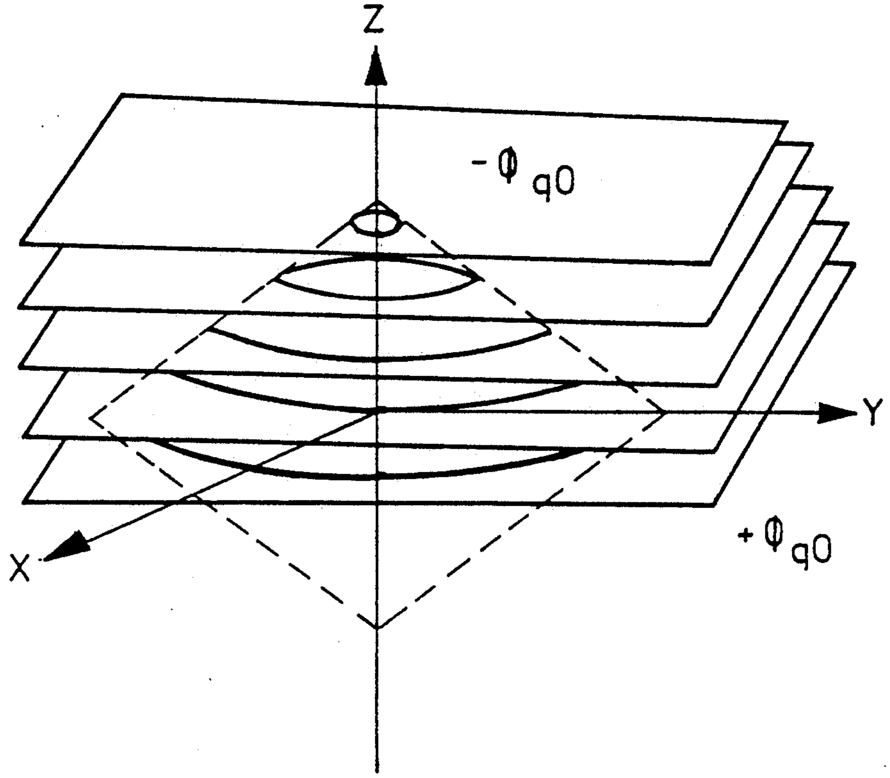
FIG. 7 shows an embodiment of the electrode structure comprising densely placed equidistant metallic sheets with circular holes to form the inner surface of the cone.

The three-dimensional quadrupole or higher multipole RF field is generated by the potential of the RF supply 10 connected to an electrode structure as shown in FIG. 7. The additional homogeneous electric field is generated by the excitation waveform generator 11.

Ions are generated by a pulsed electron beam. The filament supply 12 operates the filament 13, and the gate voltage supply 14 pulses the electron beam.

Instead of electron-impact any other ionization techniques can be applied. It is, for example, possible to use an ion beam for secondary ionization of particles inside the cell, especially if one wants to study scattering and charge transfer processes.

Also photoionization can be employed, preferably using a laser beam which can be c.w. or pulsed. Because of the high frequency-selectiveness of photoionization processes the masses of the particles under investigation inside the quadrupole field can be preselected by the choice of the proper excitation frequency leading to photoionization which can in turn be performed using a tuneable laser.

Alternatively, the ions to be studied inside the cell can be injected into the cell already in the form of a pulsed or continuous ion beam.

Figure 11:
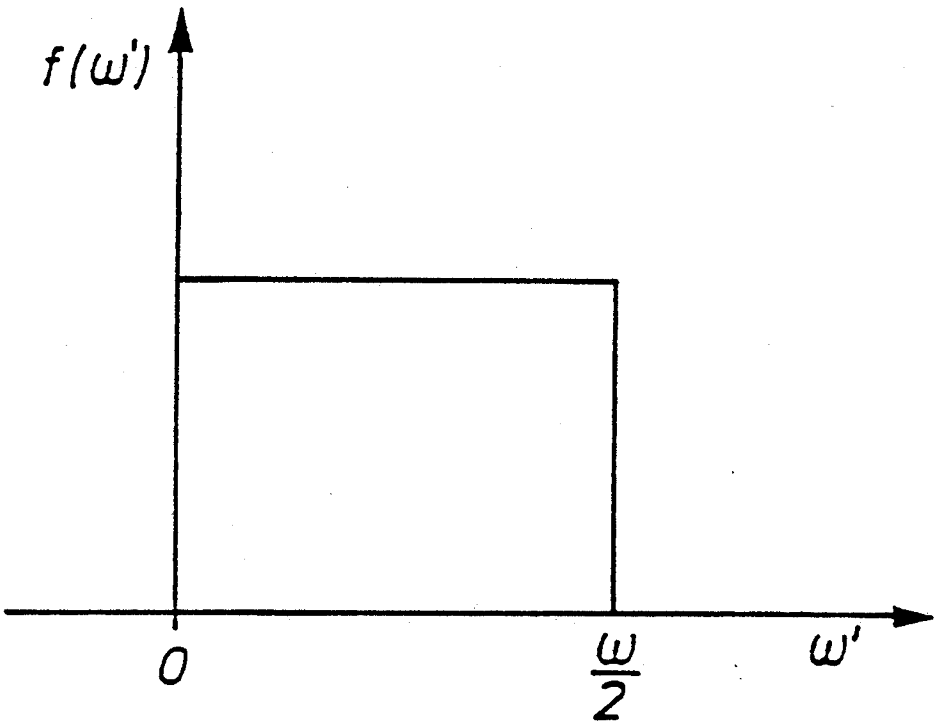
FIG. 11 shows the shape of an excitation pulse for ion excitation in the electrode structure.

To generate the image current corresponding to the ions, stored in the trap, of a certain m/q range with stable trajectories a pulse of excitation frequencies including all the characteristic frequencies of the ions under investigation is applied, distributed as shown in FIG. 11. The resonant ions absorb power and a coherent motion in z axis direction is generated.

With regard to its working mode and function the structure under consideration is equivalent to a capacitor consisting of a pair of parallel plates. After the excitation pulse, the image current signal induced by the coherent motion of the ions the in z axis direction can be detected on the boundary of the structure as if it were a capacitor with parallel plates.

An especially important technique is to employ differential detection of the image current signal at two ring plane electrodes at $z = \pm\frac{1}{2} z_0$ ($2 z_0$ being the distance from apex to apex of the double cone structure) where the trapping voltage difference is always zero in order to substantially reduce trapping voltage interference with image current detection. Furthermore, a lock-in detector can be used to further reduce this interference in signal detection.

The image current signal is amplified with a high gain broad band amplifier 15. The resulting transient signal can be subjected to digital data processing after digitation with an analog-to-digital converter 16. The frequency spectrum of the characteristic frequencies of the stored ions can be obtained by any frequency analysis technique. Fourier transformation is especially well suited. The frequency analysis and the control is performed by a scan and acquisition computer 17. The timing sequences are referenced to the master clock 18.

Instead of detecting the image current, the stored ions after mass-to-charge selective ejection by excitation of the fundamental frequencies with the homogeneous electric field can be alternatively detected by a charge-sensitive detector such as a secondary Electron Multiplier or channel plate. In this case the above mentioned ring electrodes are unnecessary and can even be omitted.

The spectrometer is operated in a pulsed mode, as shown in FIG. 12.

Figure 12A:
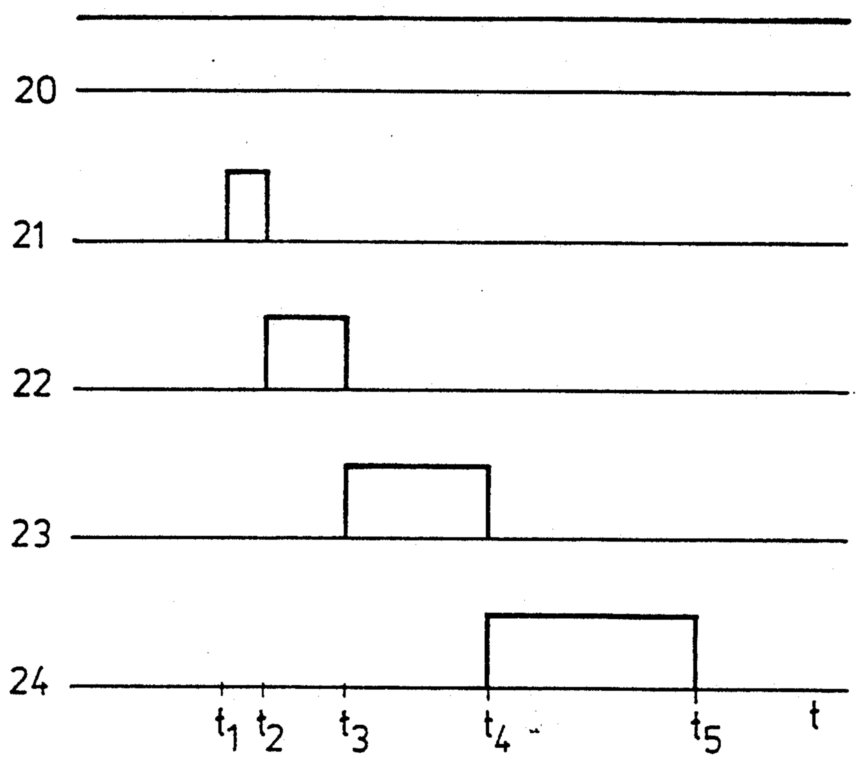
FIG. 12a and b show pulse sequences employed for generation of mass spectra.

In the case of FIG. 12*a* the RF trapping voltage 20 is applied constantly during the experiment. First, all ions which are possibly in the trap are quenched by a pulse 21 starting at a time $t_1$. At $t_2$ ions are generated with a pulse 22, e.g. an electron beam pulse of electrons having kinetic energy sufficient for ion formation. At $t_3$ ions are excited with pulse 23 and detected with detection pulse 24 starting at $t_4$. At the time $t_5$ a measuring cycle is completed.

Figure 12B:
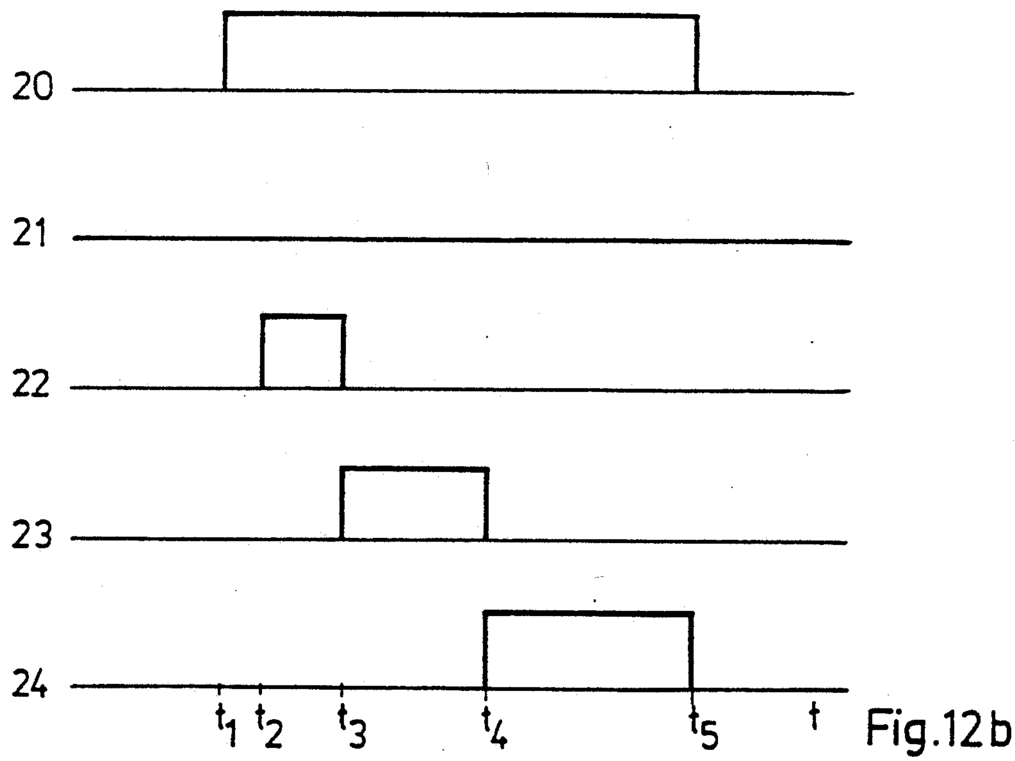

In the pulse sequence of FIG. 12*b* the quenching pulse 21 is not activated. Instead, the RF trapping voltage 20 is not constantly applied, but is started at time $t_1$ and discontinued at time $t_5$. Ions in the cell after the time $t_5$ will, due to their finite kinetic energy, drift to the electrode structure and become neutralized or even pass over the field boundary, if they, by chance, find the above mentioned apertures in the electrode structure. At the beginning of the next measuring cycle, there will be, with large probability, no charged particles inside the field boundary.

The spectral resolution depends on the observation time of the transient signal generated by the coherently moving ions.

In the described electrode structures the trapping quadrupole or higher multipole field and the z axis excitation fields are both exact and without mutual interference and, the trajectories of the ions are exactly described by the even linear Mathieu equation. This is a major advantage of the described electrode structure compared to any other trap techniques known. The excitation of the ions is independent of their position in the trap. The image current is proportional to the number of ions in the trap. The m/q ratios of the ions correspond to their characteristic frequencies.

What is claimed is:

1. Method of generating a three-dimensional rotationally symmetric electric field having at least quadrupole moments inside an electrode structure forming a boundary of said field, said method comprising the steps of applying a resultant electric potential $\Phi_{g0}$ to said electrode structure and continuously varying the resultant electric potential $\Phi_{g0}$ across said electrode structure, the method further comprising applying a second resultant electric potential to said electrode structure for generating a second, homogeneous electric field in symmetry axis direction superimposed to said three-dimensional rotationally symmetric at least quadrupole moment electric field without interaction.

2. Method as claimed in claim 1, wherein the resulting electric potential is continuously varied with position on a surface of said electrode structure adjacent said multipole field.

3. Method as claimed in claim 1, wherein a plurality of single electric potentials are applied to separate electrodes forming said electrode structure in order to constitute said resultant electric potential continuously varied across said electrode structure.

4. Method as claimed in claim 1, wherein said resultant electric potential is linearly varied along a curve of any center cross section plane of said electrode structure.

5. Method as claimed in claim 1 further comprising the step of storing ions to be analyzed in a mass-selective manner inside said boundary of the at least quadrupole moment electric field and exiting mass-to-charge specific fundamental frequencies of the ions by said second, homogeneous electric field.

6. Method as claimed in claim 5, further comprising differentially detecting image current signals in said electrode structure resulting from movements of said ions due to resonant excitation by said second electric field.

7. Method as claimed in claim 6 further comprising generating a mass spectrum of said ions by application of frequency analysis to said image current signals.

8. Method as claimed in claim 7 wherein Fourier transform techniques are employed for said frequency analysis.

9. Method as claimed in claim 7 further comprising the step of detecting ions ejected out of the boundary of said at least quadrupole moment electric field with a change-sensitive detector.

10. Method as claimed in claim 7 7 further comprising the step of generating the three-dimensional rotationally symmetric electric field for the mass spectrometric analysis of the stored ions.

11. Method as claimed in claim 10 further comprising the step of generating the ions to be analyzed outside of said electrode structure.

12. Method as claimed in claim 10 further compiising the step of generating the ions to be analyzed inside the electric field boundary.

13. Method as claimed in claim 12 wherein said ions are generated by a pulsed electron beam.

14. Method as claimed in claim 12 wherein said ions are generated by a pulsed electron beam.

15. Methods as claimed in claim 12 wherein said ions are generated by a primary ion beam.

16. Electrode structure for generating a three-dimensional rotationally symmetric electric field having at least quadrupole moments, said electric structure comprising a boundary surface having parts thereof facing the electric field, said parts comprising an electrically resistive material, the structure further comprising means for applying a second resultant electric potential to said electrode structure for generating a second, homogeneous electric field in symmetry axis direction superimposed to said three-dimensional rotationally symmetric at least quadrupole moment electric field without interaction.

17. Electrode structure as claimed in claim 16 wherein said parts comprise a nonconductive substrate material coated with a resistive material.

18. Electrode structure as claimed in claim 16 wherein said electrode structure comprises at least one resistance wire defining said boundary of said electric field.

19. Electrode structure as claimed in claim 18 wherein said resistance wire is helically wound.

20. Electrode structure as claimed in claim 18 wherein said resistance wires form a double umbrella framework.

21. Electrode structure as claimed in claim 16 further comprising apertures disposed at opposite points on said boundary surface with respect to a symmetry center of said electrode structure.

22. Electrode structure as claimed in claim 21 wherein said electrode structure comprises a double-cone shaped boundary of said quadrupole field with a distance $2z_0$ from apex to apex and a radius $r_0$ of annular contact lines of the two cones.

23. Electrode structure as claimed in claim 22 wherein said electrode structure comprises two ring plane electrodes $\pm\frac{1}{2}z_0$ from a plane defined by said annular contact lines of said two cones.

24. Electrode structure for generating a three-dimensional rotationally symmetry electric field having at least quadrupole moments, said electrode structure comprising a plurality of metallic sheets each having a circular hole defining a boundary of said field, a radius of each said hole varying successively from sheet to sheet, the sheets being densely placed with faces parallel and at selected distances from one another.

25. Electrode structure as claimed in claim 24 wherein said metallic sheets are equally spaced in distance.

26. Electrode structure as claimed in claim 24 wherein said metallic sheets are linked together by a resistance network.

27. Electrode structure as claimed in claim 26, wherein all resistors of said resistance network have the same resistance.

28. Electrode structure as claimed in claim 24 wherein each metallic sheet is equal in area.

* * * * *